United States Patent [19]

Patterson

[11] 3,785,344

[45] Jan. 15, 1974

[54] CAGE APPARATUS
[75] Inventor: Carol M. Patterson, Bryan, Tex.
[73] Assignee: Research Equipment Company, Inc., Bryan, Tex.
[22] Filed: Apr. 27, 1972
[21] Appl. No.: 248,111

[52] U.S. Cl. .................................... 119/17, 280/46
[51] Int. Cl. ........................................... A01k 1/00
[58] Field of Search ......................... 119/17, 18, 15; 280/46

[56] References Cited
UNITED STATES PATENTS
2,710,197  6/1955  Combs ................................. 280/46
  823,544  6/1906  Parker ................................. 119/17
FOREIGN PATENTS OR APPLICATIONS
 16,322  4/1956  Germany ............................. 119/17

707,991  4/1965  Canada ................................. 119/17

Primary Examiner—Louis G. Mancene
Assistant Examiner—J. N. Eskovitz
Attorney—Pravel, Wilson & Matthews

[57]  ABSTRACT

Cage apparatus for confining an animal within a cage and preventing undesired movement of the cage including an animal cage having wheels mounted at the rear thereof, resilient support means mounted at the front of the cage to support the cage and to provide reaction forces in substantially the opposite direction from forces exerted by the animal in the cage such that the cage tends to move in substantially one direction only; and, transport means for connecting to the front end of the cage to render the cage transportable.

8 Claims, 6 Drawing Figures

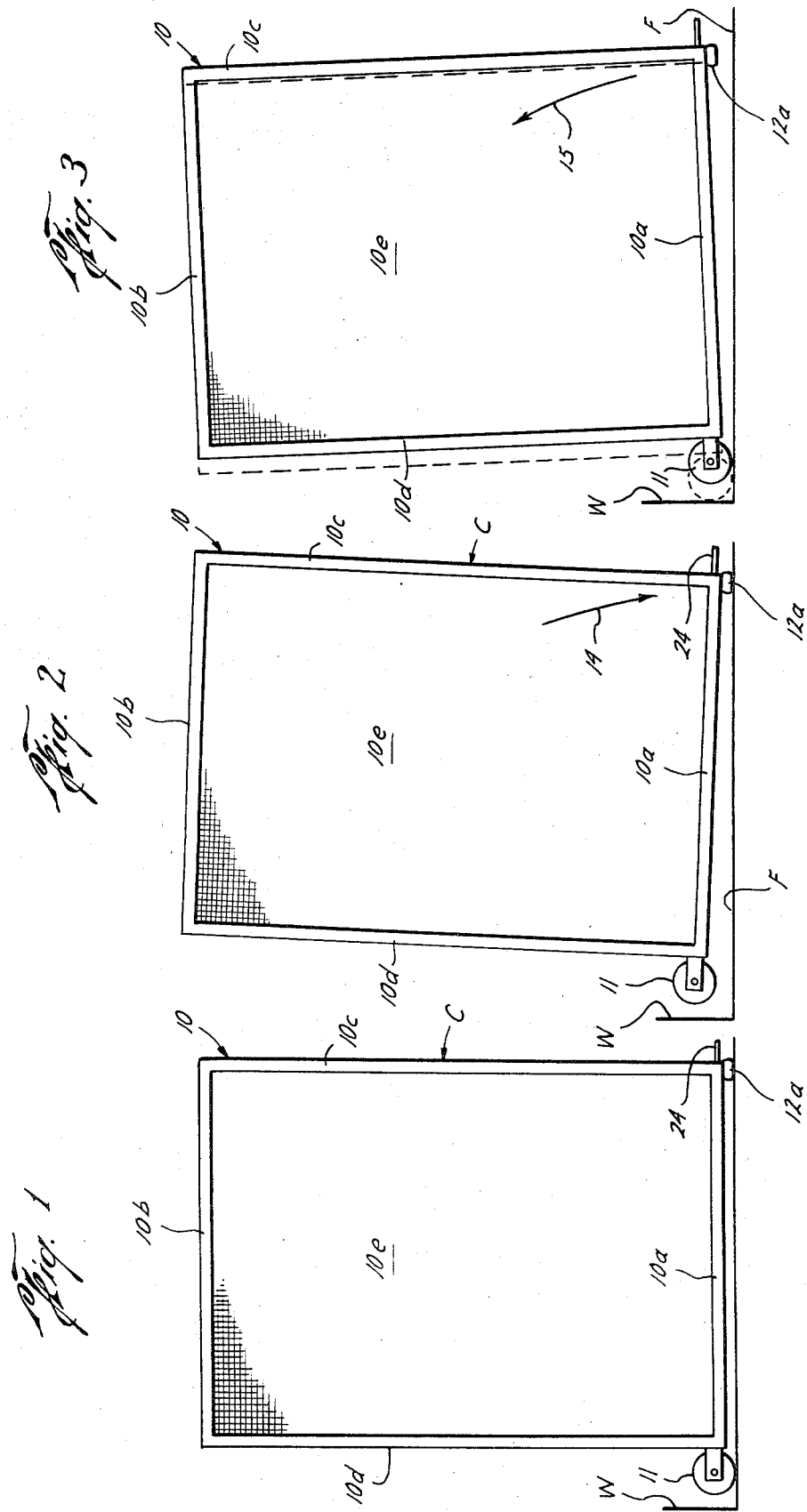

CAGE APPARATUS

BACKGROUND OF THE INVENTION

The field of the invention is animal caging.

Primate animals such as chimpanzees, orangutans and baboons may be very difficult to handle even though confined to a cage; for such primates are quite strong and tend to be very active in the cage. Actually, such primates are capable of exerting such forces in the cage as to cause an ordinary animal cage to bounce about the floor. An attempted solution to this problem has been to fasten the cage to the wall or floor in order to attempt to prevent undesired movement thereof. The fastening of the cage to the wall or floor requires special brackets and further, the cage must be unfastened before it can be moved.

Another difficulty in handling an animal such as a primate is that such animals possess somewhat uneven temperaments and are capable of harming anyone who approaches their cages. Thus it may be dangerous for a person to simply walk up to a primate cage and push or pull it to a new desired location.

SUMMARY OF THE INVENTION

It is an object of this invention to provide a new and improved cage apparatus for confining an animal in a cage and preventing undesired movement of the cage. Such new and improved cage apparatus includes a cage for confining the animal, the cage having wheels mounted at one end thereof; and, resilient support means mounted at another end of the cage for cooperating with the wheels to support the cage for translating forces exerted by the animal into movement of the cage in substantially one direction only thereby preventing undesired random movement thereof. Such resilient support means includes reaction means for providing reaction forces in substantially the opposite direction from forces exerted by the animal whereby the cage tends to move in the direction of the reaction forces.

In another aspect of this invention, a transport cart apparatus is provided for moving an animal cage having wheels mounted at one end thereof and includes a body having wheels and handle means attached thereto. The handle means of the transport cart device may be manipulated to position the body of the transport cart device in connection with another end of said cage so that the transport cart device and cage are movable as a unit.

BRIEF DESCRIPTION OF THE DRAWINGS

FIG. 1 is a side view illustrating the cage apparatus of the preferred embodiment of this invention in a normal position;

FIG. 2 is a side view similar to FIG. 1 of the cage apparatus of the preferred embodiment of this invention with the front end pushed downwardly as a result of a force exerted by an animal within the cage; and FIG. 3 is a view similar to FIG. 2 of the cage apparatus in a position of reaction to the force exerted by the animal;

DESCRIPTION OF THE PREFERRED EMBODIMENT

Figure 4:
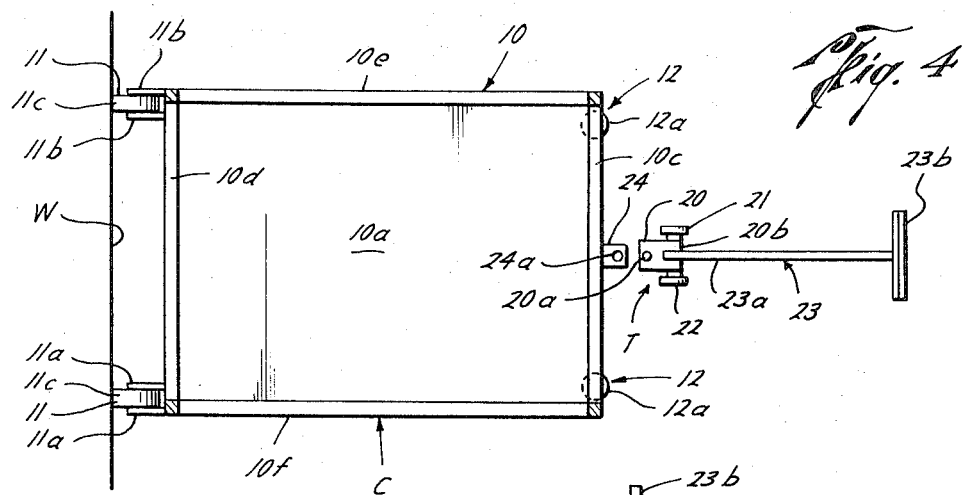
FIG. 4 is a top view of the combination cage apparatus and cart transport device of another embodiment of this invention.
Figure 5:
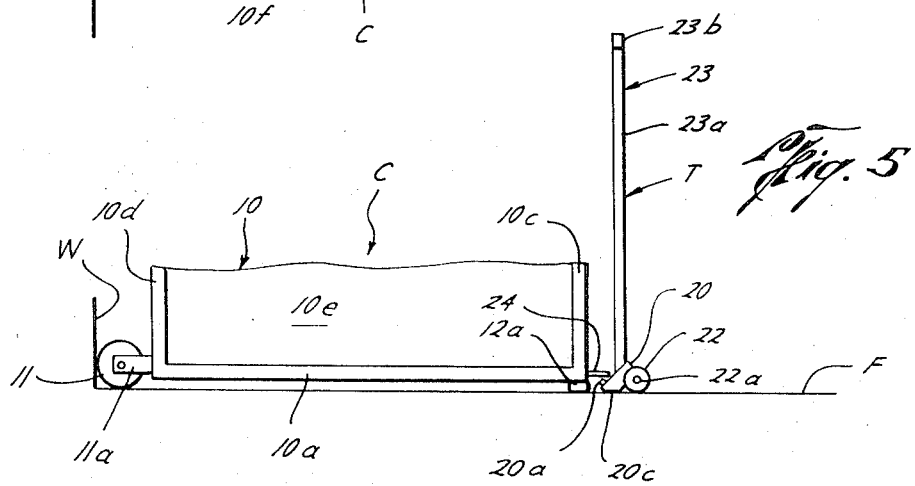
FIG. 5 is a side view of the combination cage apparatus and cart transport device with the cart transport device in position to engage the front end of the cage apparatus.

Referring to the drawings, the letter C generally designates the cage apparatus of the preferred embodiment of this invention which is utilized in combination with a cart transport device generally designated as T. The cage apparatus C includes an animal cage 10 for confining an animal. The animal cage 10 may be of any conventional construction and basically includes a bottom 10a, a top 10b, a front end 10c, a rear end 10d, and sides 10e and 10f, all of which are connected by suitable means such as welding. Of course, it is understood that one side such as front end 10c has a door (not shown) mounted therein and that the cage 10 may include other features generally found in cages for confining animals, in particular animals of greater strength such as primates—for example, chimpanzees, orangutans or large baboons.

Wheel assemblies 11 are mounted at the lower rear end 10d of the animal cage 10 for rollingly engaging floor F. The wheel assemblies 11 are attached to the rear end 10d by means of horizontally extending lugs 11a and 11b which are attached to the rear end 10d by any suitable means such as welding. Wheels 11c are mounted for rotation between the lugs 11a and 11b in a conventional manner. Thus the rear end 10d of the cage 10 is equipped by means of wheel assemblies 11 for rolling engagement with the floor F.

Resilient support means generally designated as 12 are attached to the front end 10c of the cage 10 to cooperate with the wheel assemblies 11 to support the cage 10 in a substantially upright position normally, as illustrated in FIG. 1. Further, the resilient support means 12 are provided for translating forces exerted by an animal (not shown) in the cage 10 in a forward direction into movement of the cage 10 in a substantially rearward direction. Each resilient support means 12 is a round, rubber member 12a which is attached by any suitable means to the bottom of the front end 10c of the cage 10. For the purposes of balance, the rubber members or feet 12a are mounted onto the bottom of the front end 10c near the sides 10e and 10f of the cage. In the preferred embodiment of this invention, the resilient members are rubber; however, it should be understood that it is within the scope of this invention to utilize any suitably resilient material for the resilient members 12a. And, the resilient members 12a are mounted onto the bottom of the front end 10c by such suitable means as a threaded nut and bracket combination or any other type of mounting which will secure the resilient members 12a to the bottom of the front end 10c and yet allow the resilient members to resiliently engage the floor F.

The resilient members 12a are utilized in combination with the wheel assemblies 11 not only to support the cage 10 in a level position; but also, the resilient members are utilized to translate forces exerted by an animal in the cage into movement of the cage in the rearward direction only. For example, if an animal should exert a force forward and downward in the direction of arrow 14, the resilient members 12 are compressed between the cage 10 and the floor F and thereafter expand to exert a force in the direction of arrow 15, which is substantially opposite to the force exerted in the direction of the arrow 14. If the force exerted by the animal in the direction of arrow 14 is sufficient, the force of reaction exerted by the resilient members 12a in the direction of arrow 15 will be sufficient to cause the cage 10 to move substantially rearwardly by means of the wheel assemblies 11.

In order for the cage 10 to be moved rearwardly along the wheel assemblies 11, the force of reaction exerted by the resilient members 12a in the direction of arrow 15 (or approximately in that direction, depending upon the direction of the force exerted by the animal) must be of sufficient magnitude to overcome the frictional engagement of the resilient members 12a with the floor F. In FIG. 3, the cage 10 is illustrated as being lifted off the ground at the front end 10c by the force of reaction exerted in the direction of arrow 15; however, it should be understood that the cage 10 will move rearwardly in response to a force exerted by the animal even though the front end of the cage is not lifted off of the floor F completely as illustrated in FIG. 3. Rather, the cage 10 will move rearwardly in response to any reaction force exerted by the resilient members 12a which is sufficiently great to overcome the frictional engagement of the resilient members, 12a with the floor F. Because the members 12a are resilient, it is to be understood that some of the forces exerted by an animal in the cage will be at least partially absorbed; therefore, the force of reaction exerted by the compression of the resilient members 12a may be slightly less than the force exerted by the animal. In summary, the resilient members 12a cooperate with the wheel assemblies 11 to support the cage in a normally level position, to absorb at least a portion of the forces exerted by the animal and to provide reaction forces which move the cage substantially rearwardly in response to the forces exerted by the animal in the cage.

In this manner the cage 10 is capable of moving in substantially one direction only —rearwardly— in response to movement of the animal in the cage. If the animal should exert a rearward force, the cage 10 will move rearwardly if such force is sufficient to overcome the frictional engagement of the resilient members 12a with the floor F. And, if the animal exerts a force forwardly and downwardly such as in the direction of arrow 14, the resilient members 12 provide a reaction force upwardly and rearwardly such as in the direction of arrow 15 which, if of sufficient magnitude, will cause the cage to move rearwardly.

Thus, the animal cage apparatus C of the preferred embodiment of this invention will not bounce randomly about a room in response to the hyperactivity of the animal in the cage 10. Rather, the cage will move only in a substantially rearward direction in response to the activity of the animal and, eventually the cage 10 will be moved to the position illustrated in imaginary lines in FIG. 3 against a wall W. Thereafter, any further exertion by the animal is substantially nullified by the cooperation of the resilient elements 12a and wheel assemblies 11. For any forward force exerted by the animal is either absorbed or translated into a force of reaction substantially rearwardly causing the wheels 11c to butt against the wall W. And, if the animal exerts rearward forces, the wheels 11c may be caused to engage the wall W and even bounce off thereof but, any forward movement of the cage is substantially limited by the frictional engagement of the resilient members 12a with the floor F.

The cage apparatus C of the preferred embodiment of this invention offers significant advantages over prior devices which had to be fastened to the floor or walls of a room. For the cage apparatus C can be moved from room to room and simply left in any position in the room with the assurance that any exertion by the animal will simply cause the cage to be moved eventually against a wall of the room instead of randomly about the room.

In another aspect of this invention, the cage apparatus C is combined with a transport cart device T for effective and safe movement of the cage apparatus C. The transport cart T includes a body 20 having wheels 21 and 22 mounted thereon for rolling engagement with the floor F. The wheels are mounted for rotation on the body 20 by any suitable means such as a common shaft 22a.

A handle means generally designated as 23 is provided for manipulating the body 20. The handle means 23 includes an elongated rod member 23a that is attached to the body 20 by any suitable means such as welding; and a handle gripping member 23b is attached to the rod portion 23a by any suitable means.

A stud 20a protrudes from upper surface 20b of the body lug 20. A lug 24 is welded or otherwise attached to the bottom of the front end 10c of the cage 10 and, a hole 24a is machined therein.

Figure 6:
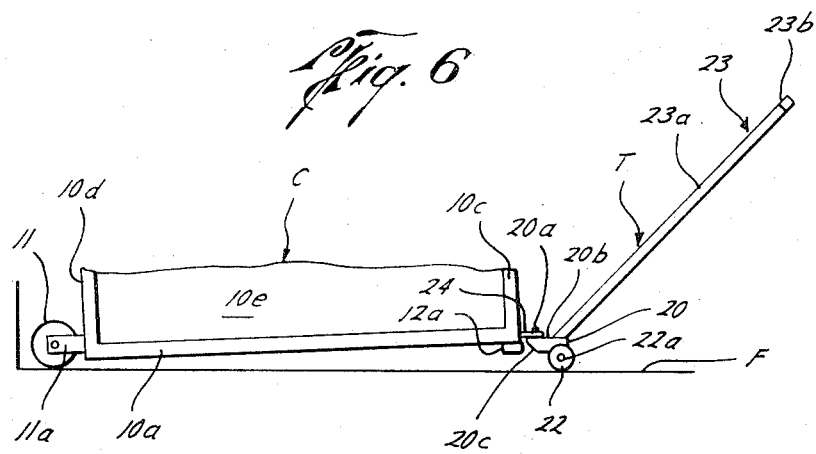
FIG. 6 is a view similar to FIG. 5 with the cart transport device in engagement with the front end of the cage apparatus.

The transport cart T is releasably attached to the cage apparatus C in the following manner. The transport cart T is moved along the floor F until the stud 20a is positioned directly underneath the opening 24a in the lug 24 extending from the cage 10. Then, the user pivots the transport cart T about wheel shaft 22a to cause the stud 20a to be inserted into the opening 24a in the lug 24 in the manner illustrated in FIG. 6. The connecting of the transport cart T to the cage apparatus C by means of the stud 20a being inserted through the opening 24a in the lug 24 provides a pivotal as well as releasable connection between the cage apparatus C and the transport device T. After the pivotal connection between the transport cart T and cage apparatus C has been accomplished, the user may push or pull the cage apparatus C in any direction desired. The length of the rod portion 23a of the handle means 23 is sufficient to maintain the user at a safe distance with respect to the animal in the cage 10. Further, the length of the handle is sufficient to allow the user to lift the front end 10c of the cage 10 off the floor F with relative ease so that the cage apparatus C can be freely moved from one location to another.

An additional feature of the transport cage T is that it can be easily and conveniently stored in an upright position until needed. The body 20 is provided with a support surface 20c which cooperates with the wheels 21 and 22 to engage the floor F and support the handle means 23 in a substantially upright position so that the transport cart T is easily stored and made readily avialable whenever needed.

The foregoing disclosure and description of the invention are illustrative and explanatory thereof, and various changes in the size, shape and materials as well as in the details of the illustrated construction may be made without departing from the spirit of the invention. For example, it should be understood that the cage 10 may be of any suitable design as long as it is provided with the wheel assemblies such as 11 and with resilient mounting members 12a which cooperate to translate forces exerted by the animal into movement in substantially one direction only. And further, that the transport cart T may be used with any type of cage wherein the cage is provided with wheel assemblies such as 11.

I claim:

1. Cage apparatus for confining an animal to a cage and for preventing undesired movement of said cage, comprising:

an animal cage;

wheel means mounted at one end of said cage for providing rolling engagement with a floor; and resilient non-rotatable support means having an anti-skid frictional lower surface and mounted at another end of said cage for cooperating with said wheel means to support said cage and for translating forces exerted by said animal in said cage into movement of said cage in substantially only the direction of said wheel means.

2. The structure set forth in claim 1, wherein said resilient non-rotatable support means includes:

reaction means for providing reaction forces directed substantially in the opposite direction from the forces exerted by said animal whereby said cage tends to move in the direction of said reaction forces.

3. The structure set forth in claim 1, wherein:

said resilient non-rotatable support means includes absorbing means formed at least in part of a yieldable compressible material for absorbing at least a portion of the force exerted by said animal.

4. The structure set forth in claim 1, wherein said resilient non-rotatable support means includes:

resilient non-rotatable feet mounted onto the front end of said cage.

5. The structure set forth in claim 4, wherein:

said wheel means are mounted at the rear end of said cage such that said cage tends to move in a substantially rearward direction only in response to movement of said animal within said cage.

6. The structure set forth in claim 1, including:

transport means including transport wheel means releasably mounted with said other end of said cage for lifting said other end whereby said cage is easily transported.

7. The structure set forth in claim 6, wherein said transport means includes:

a body;

wheels mounted on said body for engaging said floor;

connecting means releasably connecting said body with said other end of said cage, and handle means attached to said body whereby said body is povitable about said transport wheel means such that said other end of said cage can be lifted off the floor whereby said transport means and cage are movable as a unit.

8. The structure set forth in claim 5, wherein said resilient non-rotatable support means includes:

reaction means for providing a substantially rearward reaction force in response to a substantially forward reaction force exerted by said animal.

* * * * *